(12) United States Patent
Yoon et al.

(10) Patent No.: US 7,860,958 B2
(45) Date of Patent: Dec. 28, 2010

(54) NETWORK MANAGEMENT METHOD FOR WIRELESS TRANSMISSION/RECEPTION OF DATA STREAMS, AND NETWORK SYSTEM AND APPARATUS EMPLOYING THE SAME

(75) Inventors: Hyun-sik Yoon, Seoul (KR); Hyun-gyoo Yook, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1227 days.

(21) Appl. No.: 10/786,365

(22) Filed: Feb. 26, 2004

(65) Prior Publication Data

US 2004/0202123 A1    Oct. 14, 2004

(30) Foreign Application Priority Data

Mar. 31, 2003    (KR) .................... 10-2003-0020099

(51) Int. Cl.
G06F 15/173    (2006.01)
(52) U.S. Cl. .................. 709/223; 709/226; 715/200; 715/700; 707/636
(58) Field of Classification Search .......... 709/226, 709/223; 715/200, 700; 707/636
See application file for complete search history.

(56) References Cited

U.S. PATENT DOCUMENTS

| | | | |
|---|---|---|---|
| 6,078,568 A * | 6/2000 | Wright et al. ............... 370/312 |
| 7,113,484 B1 * | 9/2006 | Chapman et al. ............ 370/252 |
| 7,225,244 B2 * | 5/2007 | Reynolds et al. ............ 709/223 |
| 7,248,623 B2 * | 7/2007 | Oates ......................... 375/148 |
| 7,289,480 B2 * | 10/2007 | Lundstrom et al. .......... 370/338 |
| 2002/0080827 A1 | 6/2002 | Lee |
| 2002/0085719 A1 | 7/2002 | Crosbie |
| 2004/0039788 A1 * | 2/2004 | Lim et al. .................... 709/214 |

FOREIGN PATENT DOCUMENTS

| | | |
|---|---|---|
| CN | 1183016 A | 5/1998 |
| JP | 8-256153 A | 10/1996 |
| JP | 9-121335 | 5/1997 |
| JP | 2001359200 A | 12/2001 |
| JP | 2002-094529 | 3/2002 |
| JP | 2002171548 A | 6/2002 |
| JP | 2003-78531 A | 3/2003 |

* cited by examiner

*Primary Examiner*—Wilson Lee
*Assistant Examiner*—Tuan-Khanh Phan
(74) *Attorney, Agent, or Firm*—Sughrue Mion, PLLC

(57) ABSTRACT

A network management method for wireless transmission/reception of data streams and a network system and apparatus using the same. The network apparatus for wireless transmission/reception of data streams includes management information on wireless channels used for the data streams transmitted in a wireless manner among apparatuses in a network. Upon occurrence of an event in the network, the network apparatus processes the event by transmitting an event response signal including the management information corresponding to the event or by updating the management information corresponding to the event, thereby managing the wireless channels for the data streams transmitted in the wireless manner among the apparatuses in the network.

28 Claims, 13 Drawing Sheets

Participation of first data-streaming client
(when resource manager exists)

NETWORK MANAGEMENT METHOD FOR WIRELESS TRANSMISSION/RECEPTION OF DATA STREAMS, AND NETWORK SYSTEM AND APPARATUS EMPLOYING THE SAME

BACKGROUND OF THE INVENTION

This application claims the priority of Korean Patent Application No. 10-2003-0020099 filed on Mar. 31, 2003 in the Korean Intellectual Property Office, the disclosure of which is incorporated herein in its entirety by reference.

1. Field of Invention

The present invention relates to a network management method for wireless transmission/reception of data streams and a network system and apparatus using the same, and more particularly, to a network management method for managing wireless channels allocated to apparatuses in a network and a network system using the same.

2. Description of the Related Art

Development of new wireless techniques has resulted in a higher transmission rate, and thus, attempts have been made to replace wired home audio/video (A/V) systems with wireless systems. Recently, there have been a few attempts to make such replacements, most of which are based on streaming of Audio Video (AV) data by using a channel concept of a wireless Local Area Network (LAN).

In the related art, there is a single data-streaming server 110 and a plurality of data-streaming clients 120, 130, as shown in FIG. 1. The data-streaming server 110 functions to transmit AV streams over a channel allocated to a specific wireless channel band of a wireless interface. The data-streaming clients 120, 130 function to receive and process AV streams transmitted over the allocated channel. The data-streaming server 110 may be, for example, a set-top box or Digital Versatile Disc (DVD) player capable of transmitting AV streams over a specific channel. The data-streaming clients 120, 130 may be, for example, Plasma Display Panels (PDP's) or wall-mounted TVs capable of receiving AV streams over specific channels and processing them.

In the related art, since the quality of data streaming is lowered in an Internet Protocol (IP) network, most systems mainly solve the deterioration of quality by using a Medial Access Control (MAC) layer instead of using an IP layer. Broadcasting or multicasting is mostly used for data streaming.

The data-streaming server 110 and the data-streaming clients 120, 130 are designed to use channels allocated to wireless channel bands of a wireless interface. When the data-streaming server 110 is turned on, it begins to broadcast AV streams. When users turn on the data-streaming clients 120, 130, the data-streaming clients 120, 130 receive the AV streams transmitted over predetermined channels and display them on their screens.

The related art does not provide explicit control relationships between the data-streaming server 110 and the data-streaming clients 120, 130, and the following problems occur when a plurality of data-streaming servers 110 and data-streaming clients 120, 130 are located within the coverage area of a wireless communication system.

1. Since there are no mechanisms capable of dynamically changing an allocated channel, it is impossible to perform streaming due to interference occurring when a first data-streaming server using the same channel as a second data-streaming server is within the coverage area of the second data-streaming server.

2. Even though the first data-streaming server located within the coverage area of the second data-streaming server casually uses a different channel, a data-streaming client using the same allocated channel as the second data-streaming server cannot receive AV data transmitted from the first data-streaming server.

Therefore, there is a need for providing other technical solutions to overcome the above problems in the related art.

SUMMARY OF THE INVENTION

The present invention is conceived to solve the problems in the related art. An aspect of the present invention is to provide a method of allocating channels to eliminate radio interference which may occur when a plurality of data-streaming servers simultaneously perform streaming and to allow data streaming clients selected by users to receive streaming data from a desired data-streaming server, in order to configure and manage a network for streaming among data stream transmitting/receiving apparatuses that utilize channels allocated to wireless channel bands of a wireless interface, and an apparatus and system using the method.

Consistent with an aspect of the present invention, there is provided a network apparatus for wireless transmission/reception of data streams, comprising management information on wireless channels used for the data streams transmitted in a wireless manner among apparatuses in a network. Upon an occurrence of an event in the network, the network apparatus processes the event by transmitting an event response signal comprising the management information corresponding to the event or by updating the management information corresponding to the event, thereby managing the wireless channels for the data streams transmitted in the wireless manner among the apparatuses in the network. Consistent with the present invention, the management information comprises information on empty channels that are not used, information on allocated wireless channels, information on connection states of the apparatuses in the network according to an allocated wireless channel, apparatus information on the apparatuses in the network, channel state information, and the like. Consistent with the present invention, the event comprises an allocated channel request event for requesting a new allocated channel, an allocated channel sharing request event for requesting sharing of a currently allocated channel, a network participation request event for indicating the participation in an already established network, an allocated channel releasing request event for indicating the releasing of an already established, allocated channel, a network disconnection request event for indicating the disconnection from an already established network, and the like.

Consistent with another aspect of the present invention, there is provided a data-streaming server, comprising a control interface adapted to transmit and receive control signals to and from apparatuses in a network via a wired/wireless communication network; a channel selection unit for selecting a channel available in the network; and a wireless interface adapted to transmit data streams in the network. Consistent with the present invention, the data-streaming server comprises a network apparatus which comprises management information on wireless channels used for the data streams transmitted in a wireless manner among apparatuses in a network and in which upon occurrence of an event in the network, the network apparatus processes the event by transmitting an event response signal comprising the management information corresponding to the event or by updating the management information corresponding to the event, thereby managing the wireless channels for the data streams transmitted in the wireless manner among the apparatuses in the network.

Consistent with a further aspect of the present invention, there is provided a data-streaming client comprising a control interface adapted to transmit and receive control signals to and from apparatuses in a network via a wired/wireless communication network; a channel selection unit for selecting a channel available in the network; and a wireless interface adapted to receive data streams in the network.

Consistent with a still further aspect of the present invention, there is provided a network management method for wireless transmission/reception of a data stream, comprising collecting management information on wireless channels available for data streams transmitted in a wireless manner among apparatuses in a network via control interfaces adapted to transmit and receive control signals; and, upon an occurrence of an event in the network, processing the event by transmitting an event response signal that comprises the collected management information corresponding to the event, or by updating the management information corresponding to the event. Consistent with the present invention, the management information in the method of the present invention comprises information on empty channels that are not used, information on allocated wireless channels, information on connection states of the apparatuses in the network according to an allocated wireless channel, apparatus information on the apparatuses in the network, channel state information, and the like. Consistent with the present invention, the event in the method of the present invention comprises an allocated channel request event for requesting a new allocated channel, an allocated channel sharing request event for requesting sharing of a currently allocated channel, a network participation request event for indicating the participation in an already established network, an allocated channel releasing request event for indicating the releasing of an already established, allocated channel, a network disconnection request event for indicating the disconnection from an already established network, and the like.

Consistent with a still further aspect of the present invention, there is provided a network management method for wireless transmission/reception of data streams, comprising: by a first data-streaming server, extracting apparatus information on apparatuses in a network, from management information on wireless channels available for data streams transmitted among the apparatuses in the network; designating a second data-streaming server except the first data-streaming server, depending on the extracted information; and generating, in the second data-streaming server, a module comprising management information on the wireless channels used for the data streams transmitted in a wireless manner among the apparatuses in the network and in which upon occurrence of an event in the network, the module processes the event by transmitting an event response signal comprising the management information corresponding to the event or by updating the management information corresponding to the event, thereby managing the wireless channels for the data streams transmitted in the wireless manner among the apparatuses in the network.

BRIEF DESCRIPTION OF THE DRAWINGS

The above and other aspects and features of the present invention will become apparent from the following description of exemplary embodiments given in conjunction with the accompanying drawings, in which.

DETAILED DESCRIPTION OF THE INVENTION

Figure 1:
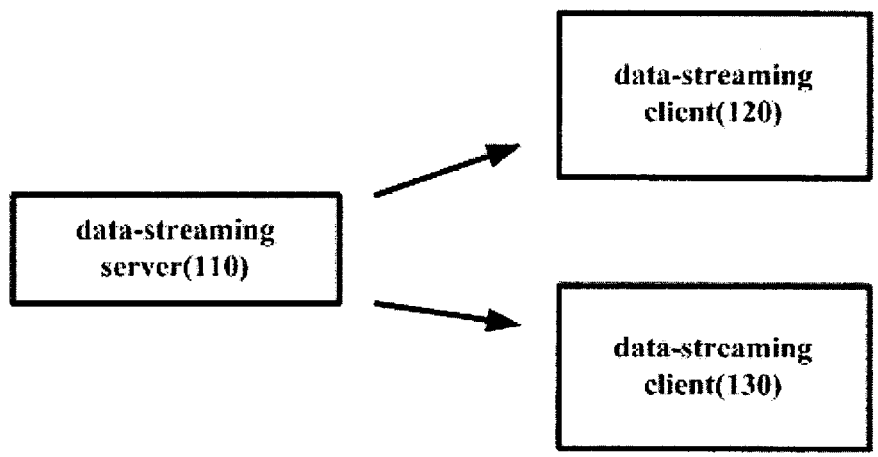
FIG. 1 is an exemplary view showing a conventional AV stream transmission scheme.

Before description of the present invention, the terms used herein are first defined as follows:

1. AV stream: A stream of data containing audio and video information therein, which is data that should be processed in real time and transferred over an allocated channel;

2. AV apparatus: An apparatus for transmitting or receiving AV streams, which may be, for example, a TV, a DVD player, a Personal Computer (PC) or the like;

3. Wireless interface: A device capable of transmitting and receiving AV streams in a wireless fashion, which may comprise a network card such as 802.11b or 802.11a;

4. Control interface: A device that enables the reliable transmission and reception of data except AV streams. This device may be a wireless network device or a separate wired network device. The control interface may comprise a network card such as 802.11b, 802.11a or an Ethernet card;

5. Data-streaming server: A data transmitting system that comprises a control interface and a channel selection unit and has a function of transmitting data streams to the wireless interface;

6. Data-streaming client: A data receiving system that comprises a control interface and a channel selection unit and has a function of receiving data streams from the wireless interface;

7. AV network: A collection of a plurality of data-streaming servers and a plurality of data streaming clients, which can transmit or receive AV streams to and from one another over channels provided by the wireless interface;

8. Control network: A collection of a plurality of data-streaming servers and a plurality of data streaming clients, which can transmit and receive control information to and from one another via the control interface. The control network may use a protocol such as Transmission Control Protocol (TCP), User Datagram Protocol (UDP) or Internet Protocol (IP); and 9. Allocated channel: A channel allocated to only one data-streaming server in a single AV network, which is used to transmit or receive AV streams. That is, assuming that N data-streaming servers in an AV network send AV streams, N channels in total are used because each server uses one channel allocated thereto.

Hereinafter, a network management method for wireless transmission/reception of data streams, a network system and device using the method consistent with embodiments of the present invention will be described in detail with reference to the accompanying drawings.

For reference, data streams defined herein collectively refer to various types of data streams such as text, audio and video. However, for the sake of convenience of description, the present invention will be described, by way of example, in connection with AV streams. In addition, as for methods for allocating wireless channels, there is a frequency allocation method, a time division allocation method, and a phase difference-based allocation method. However, for the sake of convenience of description, the present invention will be described, by way of example, in connection with the frequency allocation method.

Figure 2:
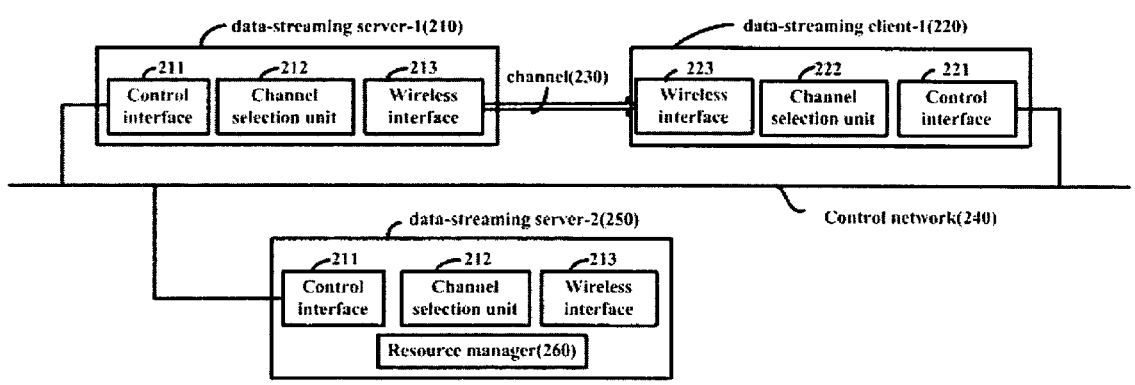
FIG. 2 is an exemplary view showing the configuration of an AV network system to which the present invention is applied.

FIG. 2 is an exemplary view showing the configuration of an AV network system consistent with an embodiment of the present invention. The AV network comprises one or more data-streaming servers 210, 250 and one or more data-streaming clients 220. Each data-streaming server 210, 250 transmits AV streams, while each data-streaming client 220 receives and processes the AV streams. Each data-streaming server 210, 250 comprises a control interface 211 for sending and receiving control commands; a channel selection unit 212 for selecting a free or empty channel that is not currently used; and a wireless interface 213 for transmitting AV streams. In some cases, the data-streaming server 250 may further comprise a resource manager 260 for managing the AV network. Each data-streaming client 220 comprises a control interface 221, a channel selection unit 222, and a wireless interface 223 for receiving AV streams. Here, the control interface may be physically implemented with a wireless network device, or a separate wired network device such as Ethernet. The data-streaming server 210, 250 and the data-streaming client 220 are treated as logical units. A single physical AV apparatus may have one or more data-streaming servers 210, 250 or data-streaming clients 200. The data-streaming servers 210, 250 transmit the AV streams to the data-streaming client(s) 220 over selected and allocated channels 230. All the devices are connected through a control network 240 that connects the control interfaces to one another. All AV apparatuses may transmit and receive control information through the control network 240 even before they participate in the AV network.

Figure 3:
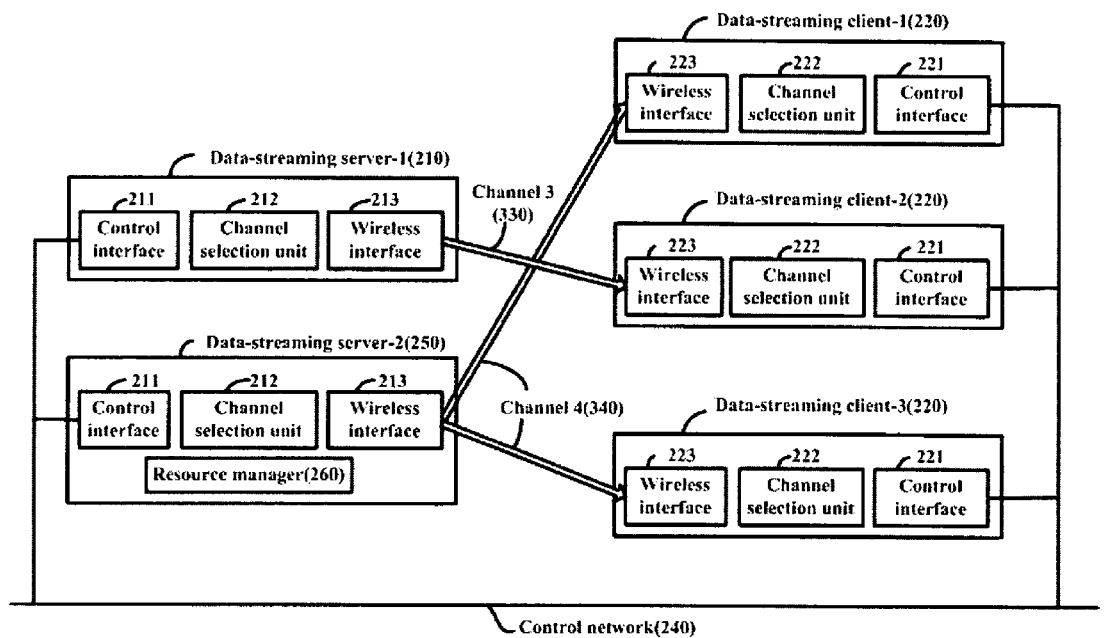
FIG. 3 is an exemplary view showing the configuration of an AV network system in which a plurality of data-streaming servers transmit AV streams, consistent with the present invention.

FIG. 3 is an exemplary view showing the configuration of an AV network system in which a plurality of data-streaming servers 210, 250 transmit AV streams, consistent with the present invention. When the data-streaming servers 210, 250 transmit the AV streams, the data-streaming servers 210, 250 use different allocated channels, respectively. For example, in a case where one data-streaming server 210 transmits AV streams to one data-streaming client 220 through channel 3 designated by reference numeral 330, other data-streaming servers cannot use channel 3. If another data-streaming server 250 intends to transmit AV streams, the other data-streaming server should use a different allocated channel. For example, another data-streaming server 250 can transmit AV streams to two data-streaming clients 220 using channel 4 designated by reference numeral 340.

Figure 4:
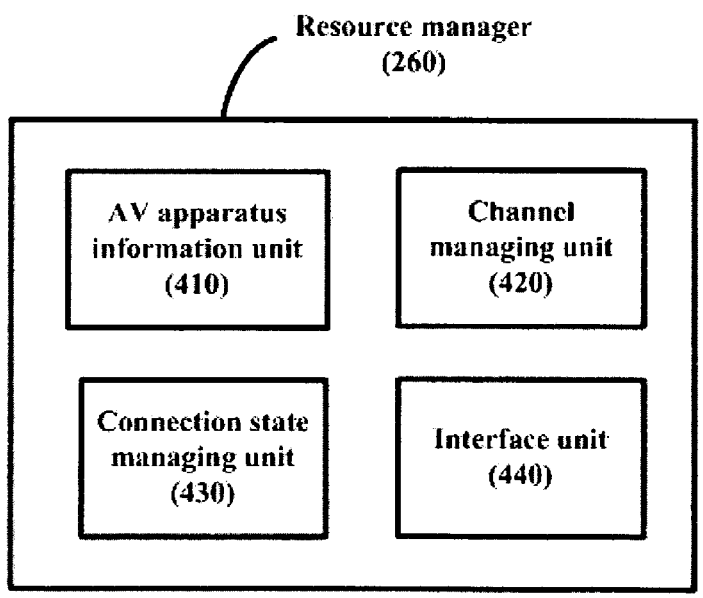
FIG. 4 is a block diagram schematically showing the configuration of a resource manager consistent with the present invention.

FIG. 4 is a block diagram schematically showing the configuration of a resource manager consistent with the present invention. The resource manager 260 is a module operating in an apparatus in which a data-streaming server is running, and serves as a middle manager for enabling channel management proposed by the present invention. The resource manager 260 comprises the following sub-modules: an AV apparatus information managing unit 410 for maintaining and managing a list of AV apparatuses that currently participate in the AV network; a channel managing unit 420 for maintaining and managing a list of empty channels and a list of busy channels; a connection state managing unit 430 for maintaining and managing a topology map of AV apparatuses which are currently streaming AV data; and an inference unit 440 for inferring specific situations in consideration of the current AV network status. Only one resource manager can exist throughout the whole AV network, and this resource manager generally exists in a data-streaming server. The following steps are needed to transmit or receive AV streams between a data-streaming server and data-streaming clients over an allocated channel:

establishing the AV network as the data-streaming server begins to operate;

participating in the already established AV network by the data-streaming server;

causing a data-streaming client to begin to operate;

establishing the allocated channel by the data streaming server and the data-streaming client therebetween;

establishing, by a new data-streaming client, the allocated channel by using the already established allocated channel;

performing data streaming over the allocated channel;

terminating the reception of AV streams and releasing the allocated channel by the data-streaming clients;

terminating the transmission of the AV streams and releasing the allocated channel by the data-streaming server;

causing the data-streaming clients to be disconnected from the AV network; and causing the data-streaming server to be disconnected from the AV network.

These steps are accomplished by a protocol defining the flow of a series of messages that are transmitted through the control network.

Figure 5:
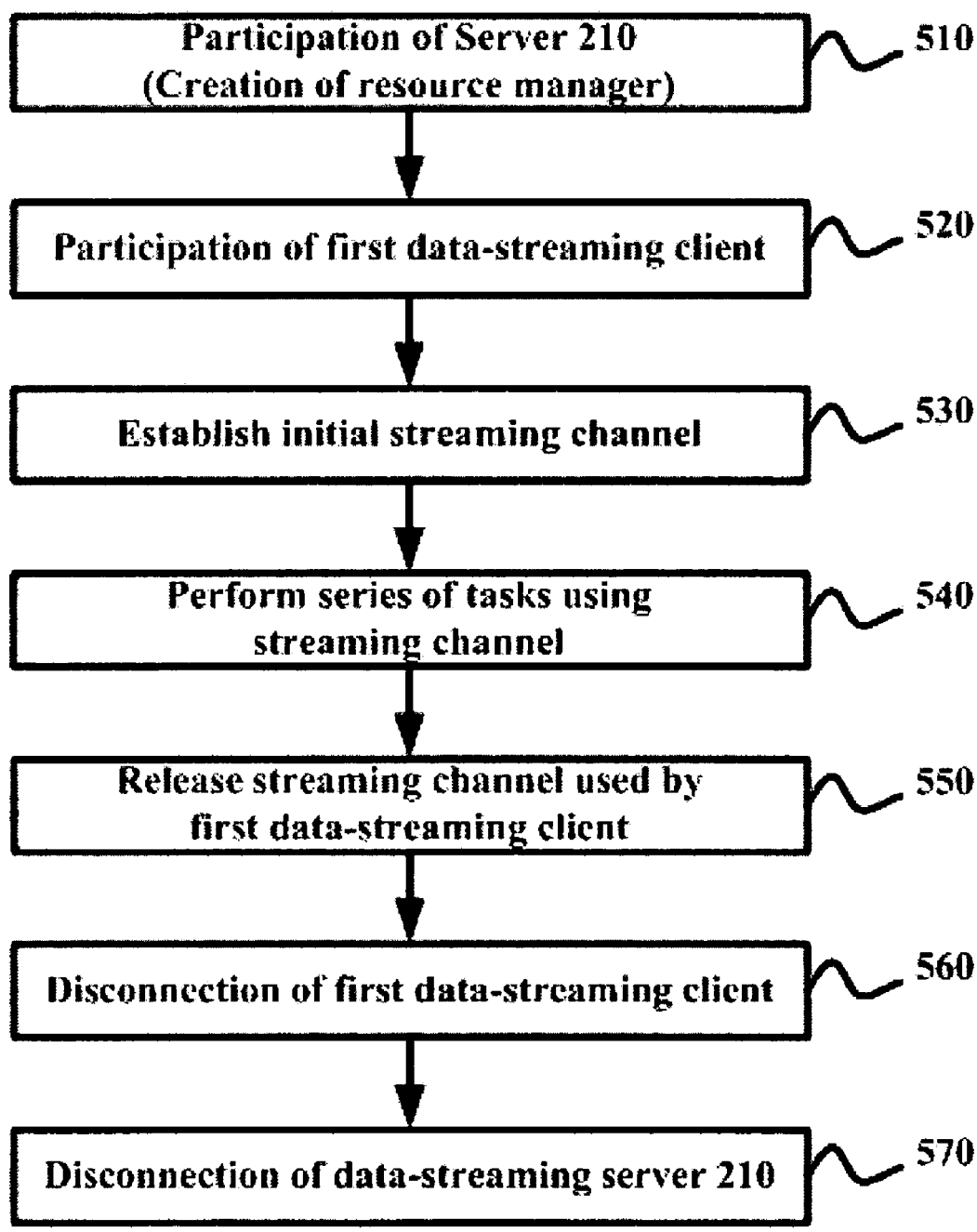
FIG. 5 is a flowchart illustrating the process of managing channels of radio frequency bands in an AV network to which the present invention is applied.
Figure 6:
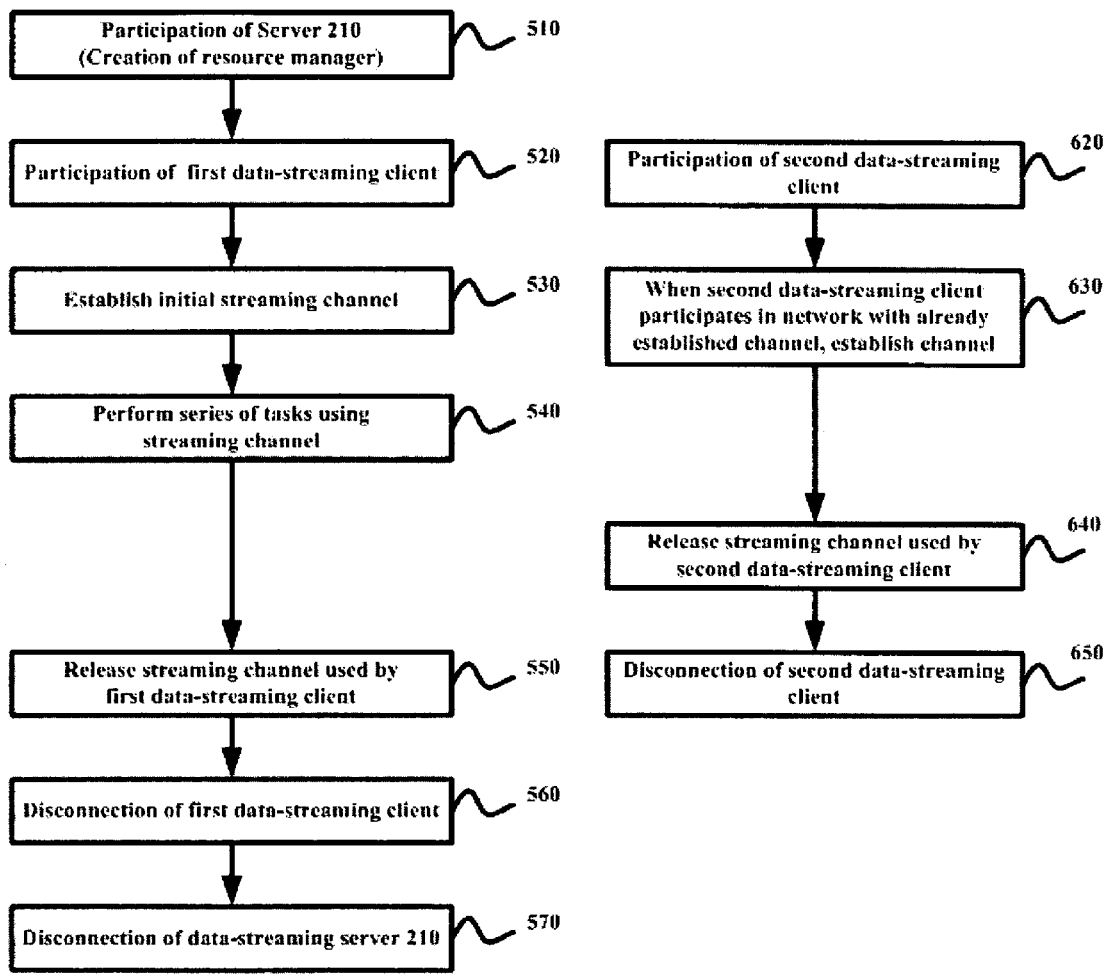
FIG. 6 is a flowchart illustrating the process of participating in an already established AV network by a new data-streaming client consistent with the present invention.

FIGS. 5 and 6 are flowcharts collectively illustrating these steps.

FIG. 5 is a flowchart illustrating the process of managing channels of radio frequency bands in an AV network to which the present invention is applied, and shows a case where data-streaming server 210 transmits AV streams to a first data-streaming client. FIG. 6 shows a case where a second data-streaming client newly participates in the network in order to receive the AV streams transmitted from data-streaming server 210 while data-streaming server 210 transmits the AV streams to the first data-streaming client. In a case where data-streaming server 210 transmits the AV streams to the first data-streaming client, a resource manager is first generated and data-streaming server 210 is registered in the resource manager (510), as shown in FIG. 5.

Figure 12:
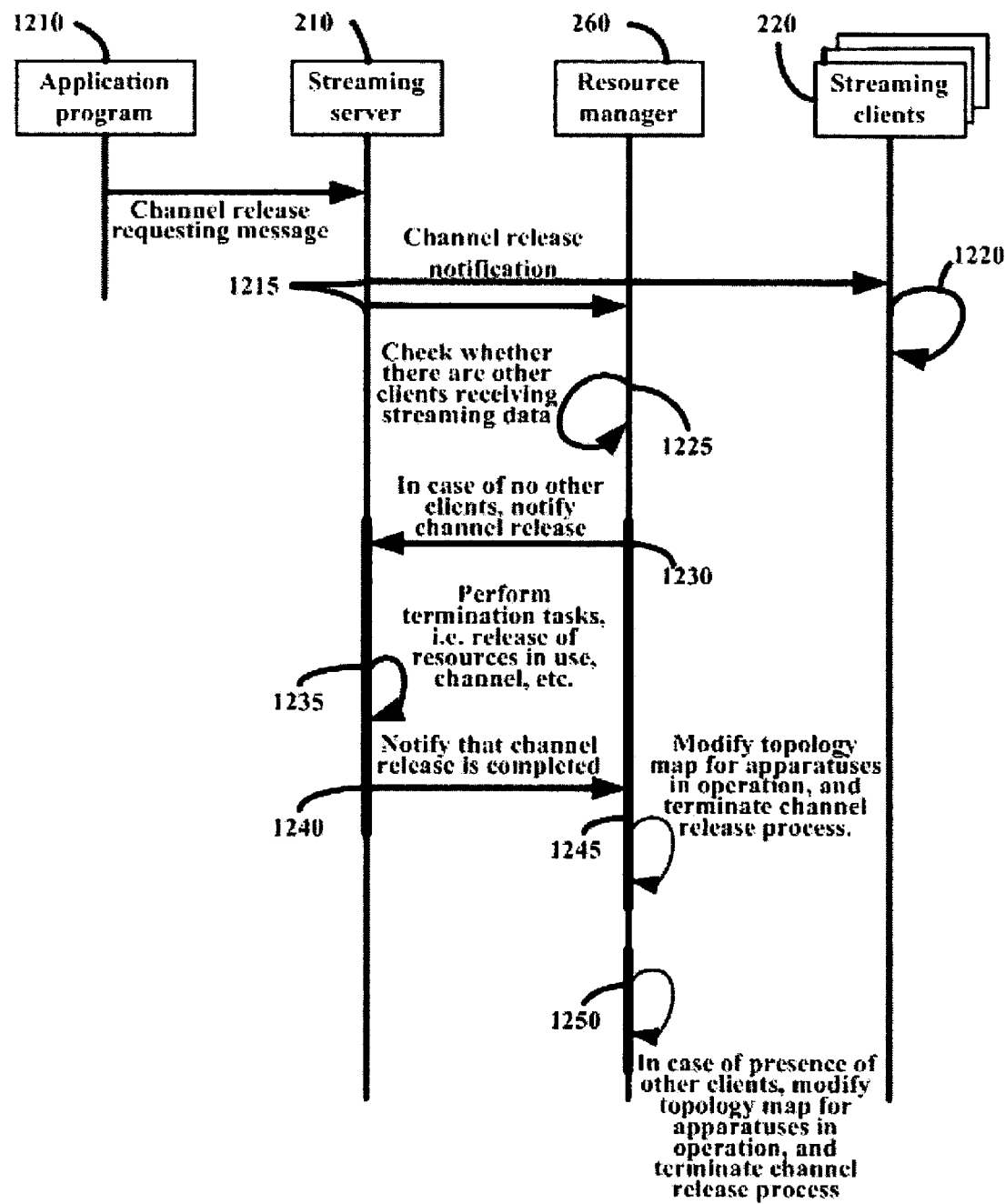
FIG. 12 is a sequential diagram illustrating the process of releasing an allocated channel by a data-streaming client consistent with an embodiment of the present invention.

Thereafter, as shown in FIG. 9(*b*), the first data-streaming client participates in the AV network (520). Next, as shown in FIG. 10, both data-streaming server 210 and the first data-streaming client establish an initial streaming channel (530), and data-streaming server 210 utilizes the established allocated channel to perform tasks such as play or stop involved with the AV stream transmission (540). Next, at the time when either the first data-streaming client or data-streaming server 210 no longer wishes to receive or transmit the AV streams, the channel allocated to the first data-streaming client is released as shown in FIG. 12, which leads to the release of the channel allocated to data-streaming server 210 (550).

Figure 11:
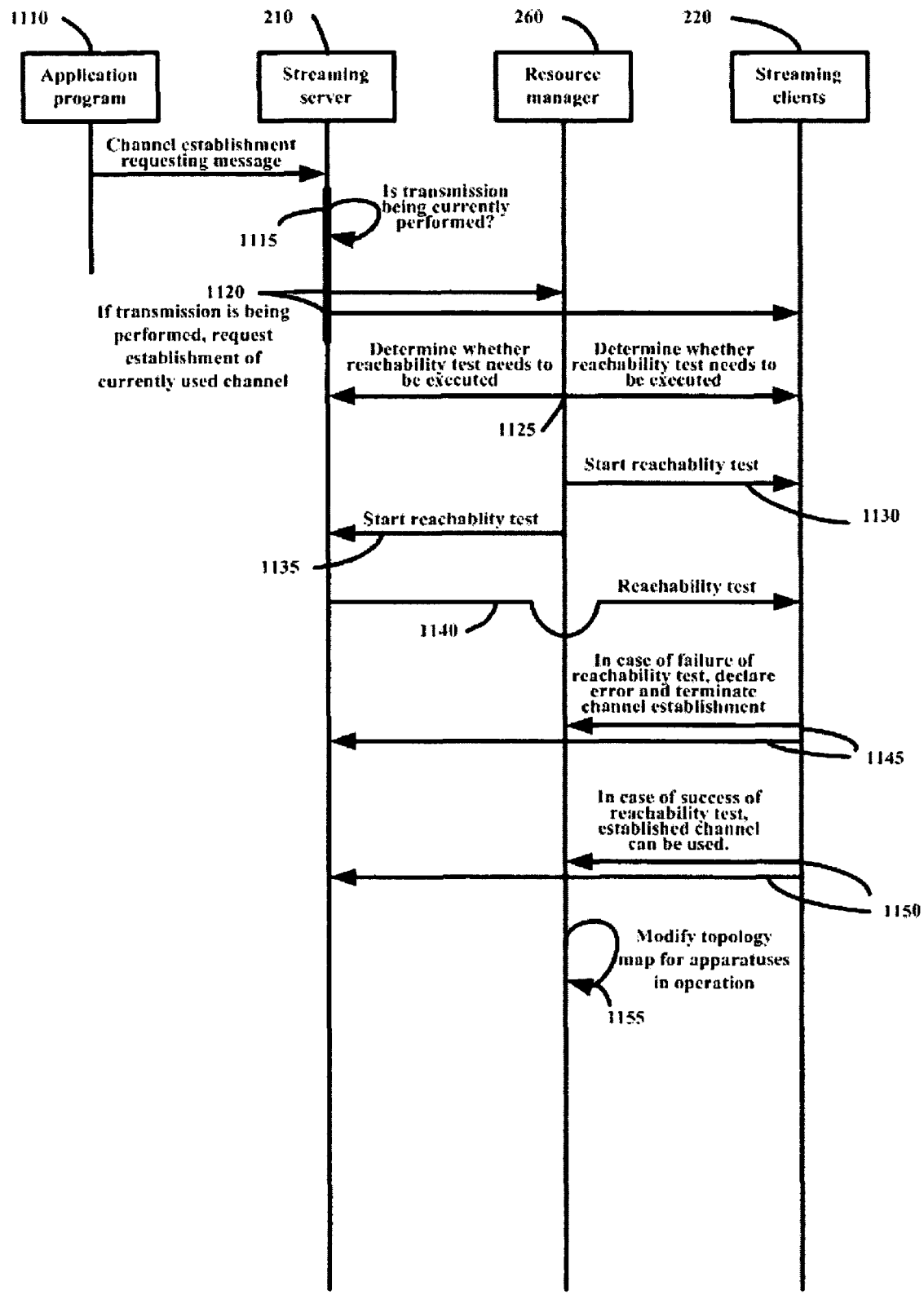
FIG. 11 is a sequential diagram illustrating that a new data-streaming client shares an allocated channel at a specific frequency band already established, consistent with an embodiment of the present invention.
Figure 13:
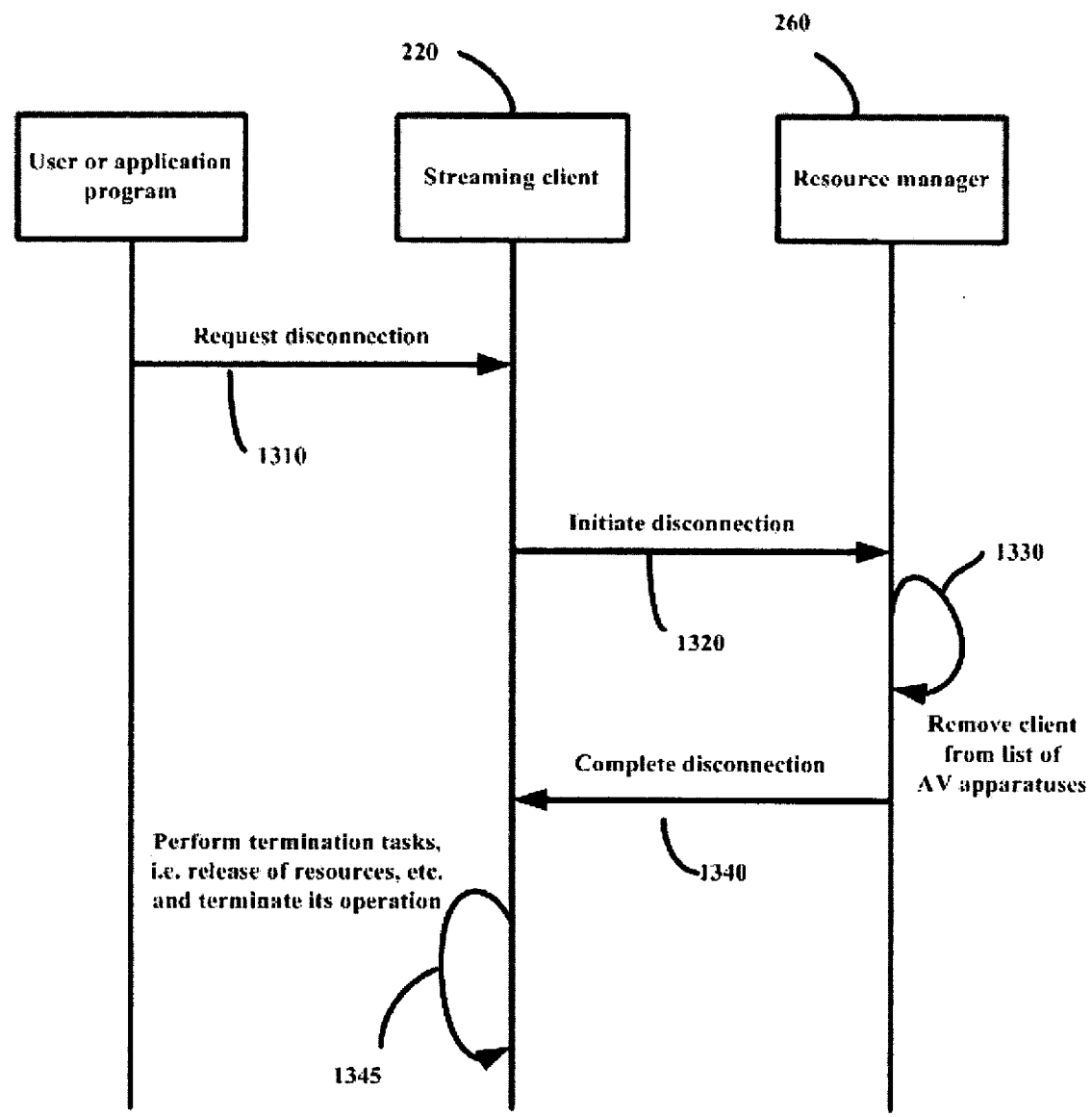
FIG. 13 is a sequential diagram illustrating that a data-streaming client is disconnected from an AV network consistent with an embodiment of the present invention.
Figure 14:
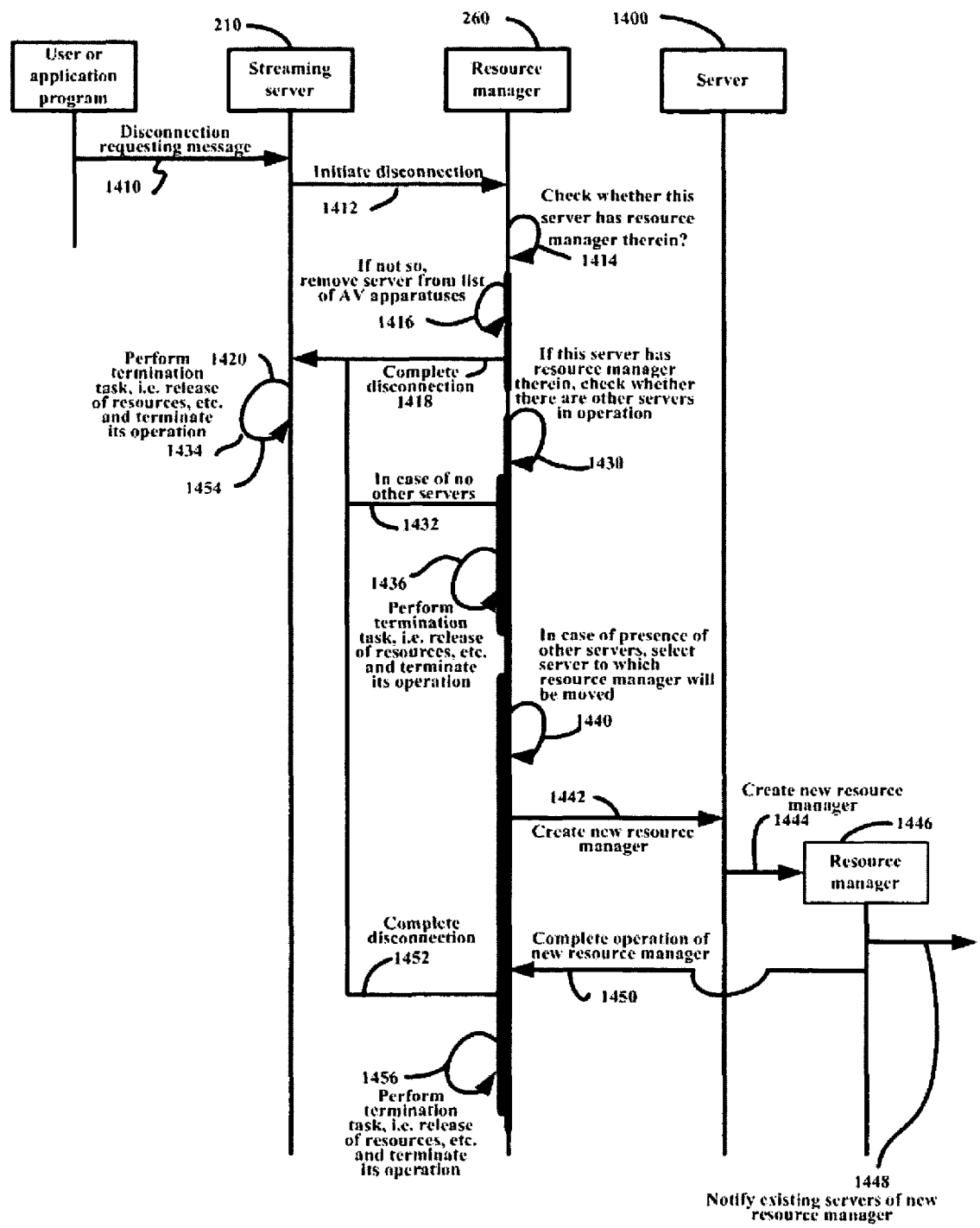
FIG. 14 is a sequential diagram illustrating that a data-streaming server is disconnected from an AV network consistent with an embodiment of the present invention.

Next, as shown in FIG. 13, the first data-streaming client is disconnected from the AV network (560), and as shown in FIG. 14, data-streaming server 210 is also disconnected from the AV network (570). If the second data-streaming client receives the AV streams over the channel allocated to data streaming server 210 during the above procedures, the second data-streaming client participates in the AV network through sequential procedures shown in FIG. 9(*b*) (620). Thereafter, as shown in FIG. 11, the second data-streaming client goes through procedures for receiving the AV streams over the channel previously allocated to data-streaming server 210 (630), and receives the same AV streams as the first data-streaming client from data-streaming server 210. Next, as shown in FIG. 12, the second data-streaming client terminates the reception of the AV streams, releases its own allocated channel (640) and then is disconnected from the AV network (650), as shown in FIG. 13.

The procedures shown in FIGS. 5 and 6 are merely one example among various possible procedures. For example, if the channel allocation fails in step 620 in which the second data-streaming client participates in the network, an application program may release the channel allocated to the first data-streaming client, and then re-establish a channel to be allocated to the first and second data-streaming clients. A longer stop period may waste AV network resources. This can be avoided by entering into the process of releasing the channel allocated to the first data-streaming client and re-establishing a channel when play is selected afterward. It will be considered that this variation is just one example of many possible variations based on the procedures shown in FIGS. 5 and 6, which will be apparent to those skilled in the art.

Figure 7:
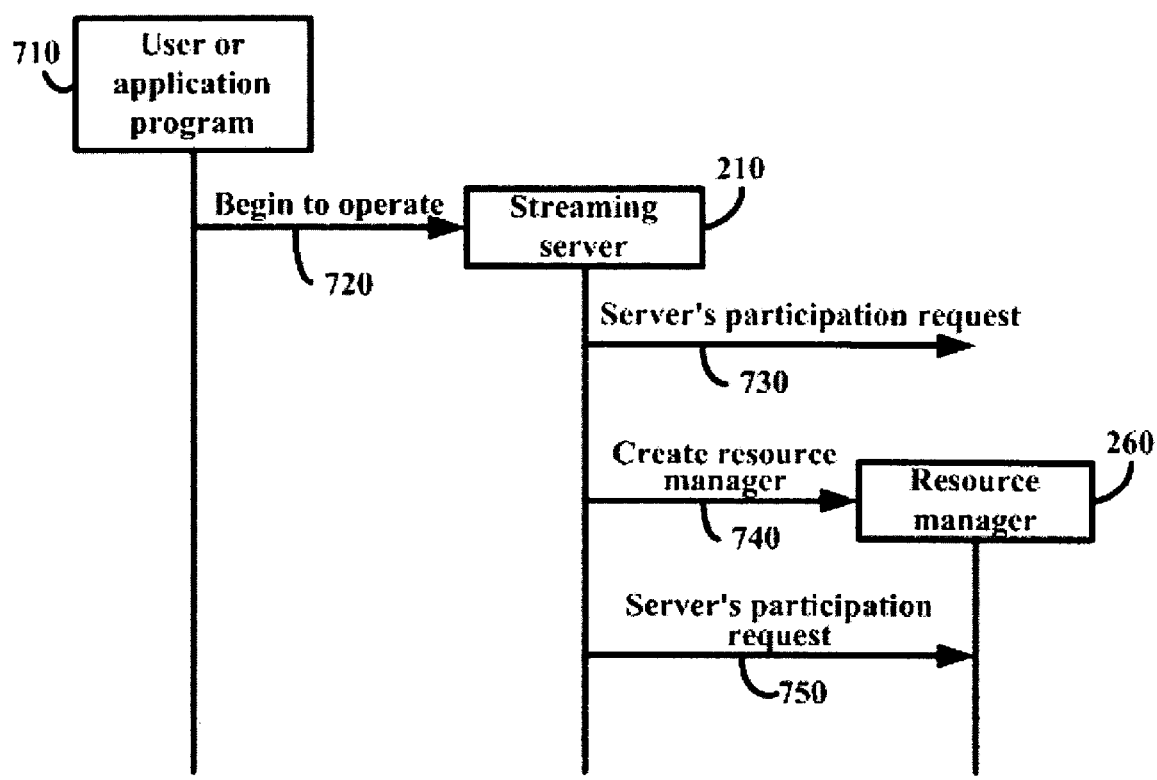
FIG. 7 is a sequential diagram illustrating a process of generating a resource manager consistent with an embodiment of the present invention.

FIG. 7 is a sequential diagram illustrating a process of generating a resource manager consistent with an embodiment of the present invention, and shows the process of establishing an AV network while a data-streaming server begins to operate. The data-streaming server 210, which is activated by a user or an application program 710 (720), informs the resource manager via multicasting or broadcasting that a new data-streaming server participates in the AV network (730). However, since the resource manager does not exist during the establishment of the AV network, the data-streaming server 210 cannot receive a response from the resource manager. Thus, the data-streaming server 210 activates software modules or hardware modules included therein to generate the required resource manager 260 (740). The data-streaming server 210 informs the activated resource manager 260 of a participation request thereof, and also sends its own identification information containing a unique ID, information on a wireless interface and the like (750).

Figure 8:
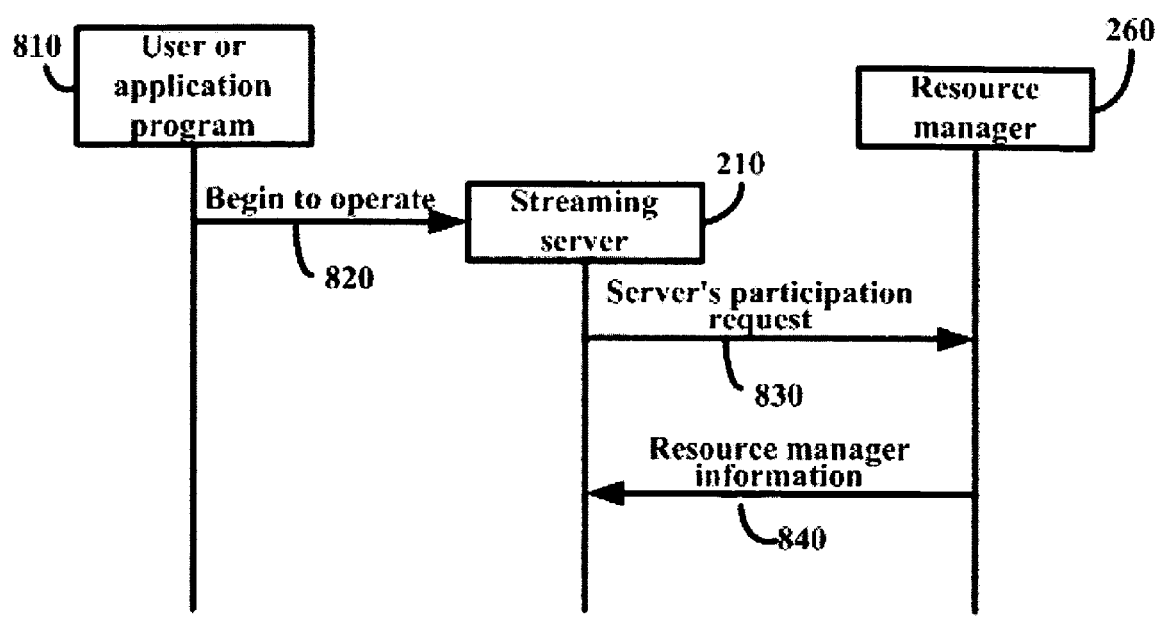
FIG. 8 is a sequential diagram illustrating the participation of a data-streaming server consistent with an embodiment of the present invention.

FIG. 8 is a sequential diagram illustrating the participation of a data-streaming server 210 consistent with an embodiment of the present invention, and shows the process that the data-streaming server 210 participates in an already established AV network. The data-streaming server 210 newly activated by a user or application program multicasts or broadcasts a participation request to the resource manager 260 via the control network in order to inform that it participates in the AV network (810, 820). At this time, the data-streaming server 210 also sends its own identification information containing its own unique ID, information on a wireless interface, and the like (830). The resource manager 260 that has received the information transfers information on the resource manager 260 to the data-streaming server 210 (840).

Figure 9A:
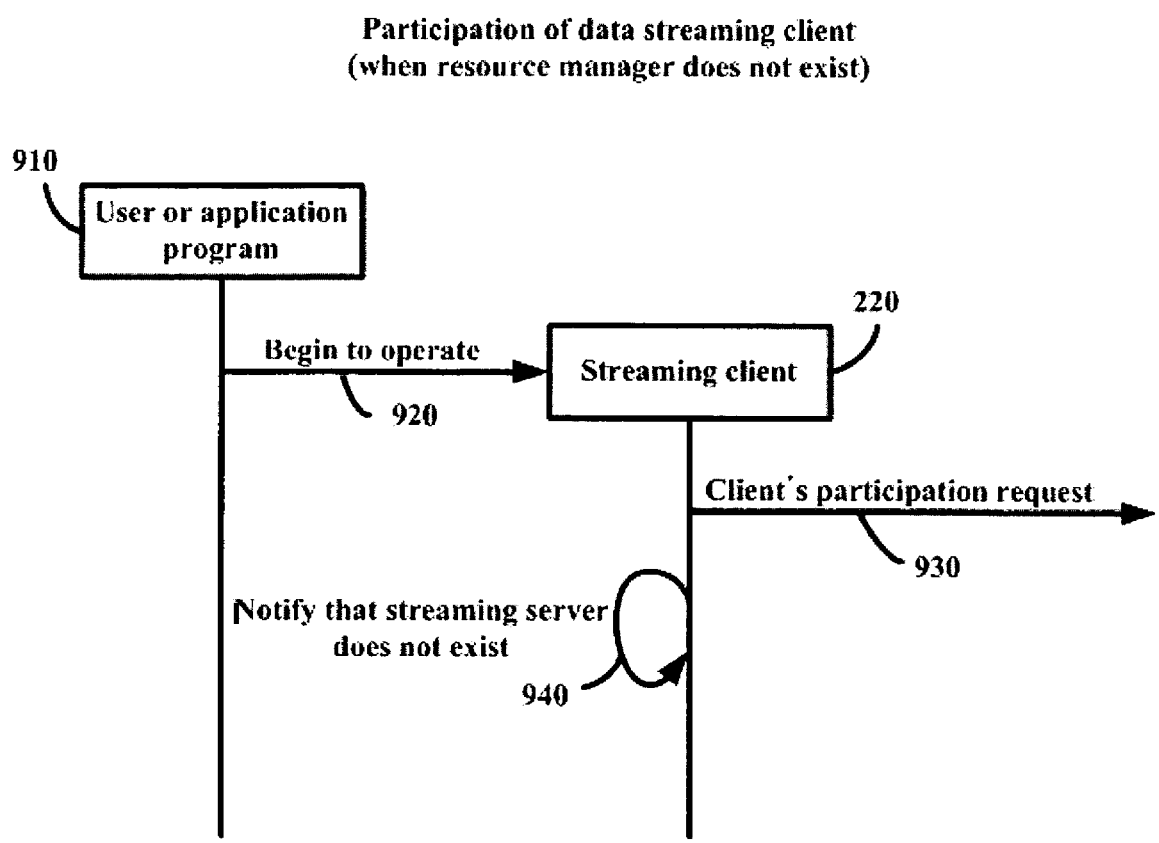
FIG. 9a is a sequential diagram illustrating the participation of a data-streaming client in a case where a resource manager does not exist, consistent with an embodiment of the present invention.
Figure 9B:
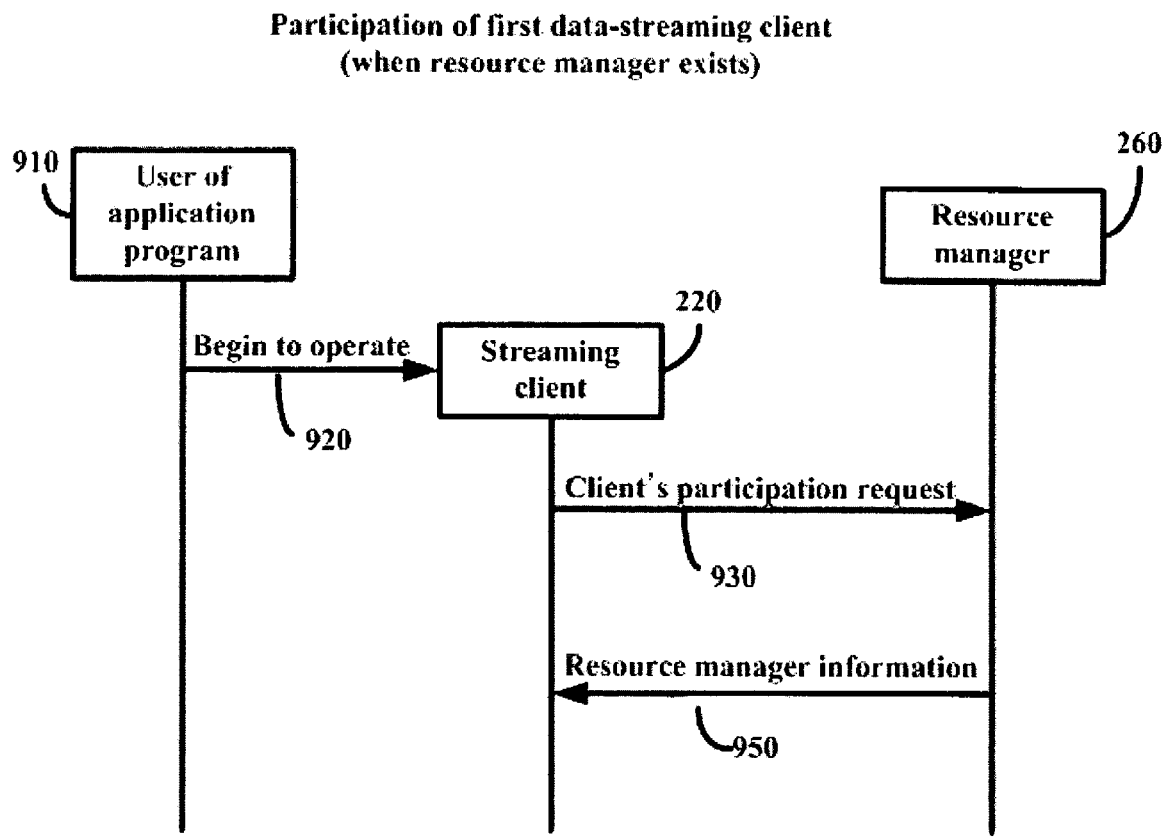
FIG. 9b is a sequential diagram illustrating the participation of a data-streaming client in a case where the resource manager exists, consistent with an embodiment of the present invention.
Figure 10:
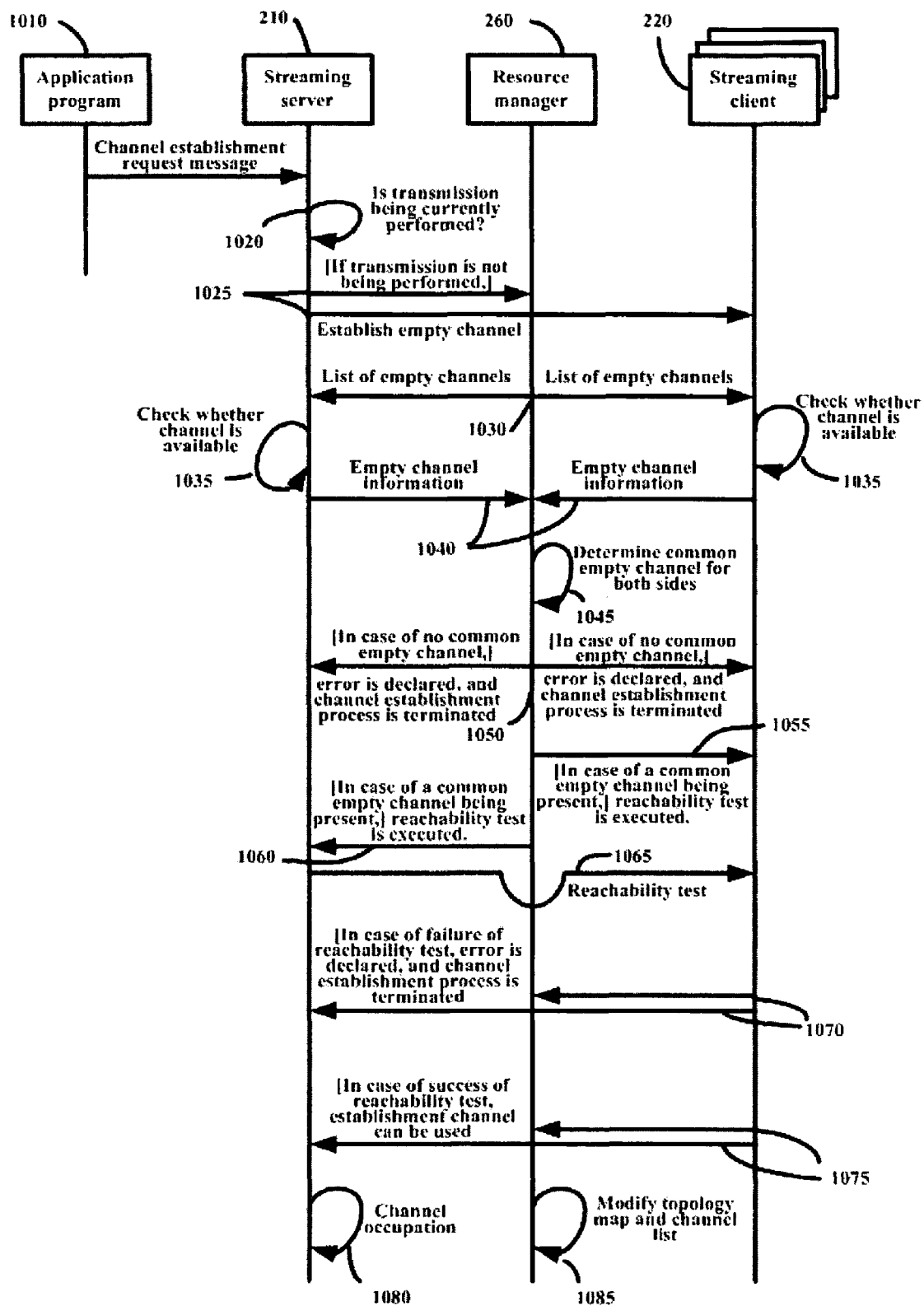
FIG. 10 is a sequential diagram illustrating the establishment of an allocated channel consistent with an embodiment of the present invention.

FIGS. 9*a* and 9*b* illustrate sequential diagrams for the participation of a data-streaming client 220 consistent with an embodiment of the present invention, wherein FIG. 9*a* shows a case where a resource manager 260 does not exist, and FIG. 9*b* shows a case where the resource manager 260 exists. The data-streaming client 220 activated by a user or application program multicasts or broadcasts a participation request via the control network in order to inform the resource manager 260 that the data-streaming client 220 begins to operate (910, 920, 930). If the resource manager 260 has not yet been generated, no response is received from the resource manager 260. Then, the data-streaming client 220 determines that a data-streaming server 210 has not yet existed (940). If the resource manager 260 sends information on the resource manager 260 to the data-streaming client 220 in response to the participation request that has been sent to the resource manager 260 by the data-streaming client 220 (950), the data-streaming client 220 can participate in the AV network. Upon request of the participation thereof in the AV network (930), the data-streaming client 220 sends the resource manager 260 its own identification information containing its own unique ID, information on a wireless interface, and the like.

FIG. 10 is a sequential diagram illustrating the establishment of an allocated channel consistent with an embodiment of the present invention. This process commences when an application program sends a channel establishment-requesting message to the data-streaming server 210. This message contains information on data-streaming clients that wish to receive AV streams. The data-streaming server 210 that receives the information first checks whether the data-streaming server 210 currently has its own allocated channel (1020). If the data- streaming server 210 has the allocated channel, it performs the procedures shown in FIG. 11. Otherwise, the data-streaming server 210 sends a message, which indicates that it is going through the process of establishing an allocated channel, to both the resource manager 260 and the data-streaming clients 220 (1025).

In response to this message, the resource manager 260 transfers a list of empty channels, which are not currently used by the other data-streaming servers 210 present in the AV network, included in a list of channels of the resource manager 260 to the data-streaming server 210 and the data-streaming clients 220 (1030). At this time, other information on whether both sides need a reachability test may be further sent by the resource manager 260 (1065). The resource manager 260 can determine whether a reachability test needs to be performed between both sides by referring to inference induced by the inference unit 440 based on past success patterns or the current connection state of other AV apparatuses. If the resource manager 260 determines that a reachability test is not required, the resource manager 260 notifies the determination results by using a message (1030). In this case, steps 1055, 1060, 1065 and 1070 for transferring messages associated with the reachability test are omitted, and the procedure directly goes to the reachability test success step.

After step 1030, the data-streaming server 210 and the data-streaming clients 220 determine whether channels in the received list are actually empty and thus available (1035). This may be performed by means of many possible methods. For example, the channels informed by the resource manager 260 may be sequentially checked one by one, or only several initial channels may be checked. The purpose of performing this process is to sort out channels that may be currently used by other networks except the present AV network. Since it is impossible to know when channels used by other networks are occupied or released, the resource manager 260 does not manage such channels. Thus, channels are dynamically checked whenever a check is required, in the same manner as step 1035. When the resource manager 260 receives information on empty channels from the data-streaming server 210 and the data-streaming clients 220, the resource manager 260 determines whether there is a common empty channel for both sides (1045). If it is determined that there is no common empty channel, the resource manager 260 notifies both sides of the cause thereof, and terminates the channel establishment process (1050). In this case, the resource manager 260 notifies both sides of the cause of the channel allocation failure. The cause comprises a list of channels that were available to the data-streaming 210 server, a list of channels that were available to the data-streaming clients 220, and the like.

If the resource manager 260 finds a common empty channel for both sides, the resource manager sends both sides a message instructing them to perform a reachability test (1055, 1060). The data-streaming server 210 sends the data-streaming clients 220 test data such as short AV streams (1065) prepared beforehand, and the data-streaming clients 220 receive the test data and inform the data-streaming server 210 and the resource manager 260 of the reception results of the test data (1070, 1075). The reason for performing a reachability test is that even though an allocated channel over which both sides commonly communicate has been found, there may be a case where both sides could not transmit and receive the AV streams due to various causes such as excessive distance, obstacles including walls, or unknown interference occurring on the same frequency band. To this end, it is checked with a reachability test whether the transmission/reception of the AV streams can be actually achieved, and the results thereof (i.e., the possibility of transmission/reception, or a currently possible transmission rate, etc.) are transferred to the data-streaming server 210 and the resource manager 260. If the reachability test fails, the data-streaming client 220 informs the resource manager 260 and the data-streaming server 210 of the results and then terminates the channel establishment process (1070).

If the reachability test is successfully performed, this means that the channel is available. The resource manager 260 and the data-streaming server 210 are notified of the results (1075). Then, the data-streaming server 210 uses the allocated channel to transmit the AV streams. Further, even when there are no AV streams to be transmitted, the data-streaming server 210 transmits dummy data to indicate that the allocated channel is being used (1080) and thence to prevent the allocated channel from being used by other networks.

In addition, the resource manager 260 registers the data-streaming server 210 and the data-streaming clients 220, which are newly connected with each other, in the connection state managing unit 430 of the resource manager by modifying the connection state managing unit. Further, the resource manager 260 modifies and updates the contents of the channel managing unit 420 (1085). Through these procedures, the data-streaming server 210 and the data-streaming clients 220 have a common, allocated channel which is not used by other data-streaming servers, and transmit and receive the AV streams over the allocated channel.

FIG. 11 is a sequential diagram illustrating that a new data-streaming client 220 shares an allocated channel at a specific frequency band already established, consistent with an embodiment of the present invention. A channel establishment request initiated with the participation of a new data-streaming client 220 is sent to the data-streaming server 210. The data-streaming server 210 first checks whether the data-streaming server 210 has its own allocated channel at present (1115). Otherwise, the procedures shown in FIG. 10 are performed. However, if the data-streaming server 210 has its own allocated channel at present, the data-streaming client 220 then uses the allocated channel. To this end, the data-streaming server 210 sends the resource manager 260 and the data-streaming client 220 information on the current, allocated channel (1120).

Further, the resource manager 260 determines through the inference unit 440 thereof whether a reachability test should be performed, and notifies the data-streaming server 210 and the data-streaming client 220 of the determination results (1125). If it is determined that a reachability test need not be performed, steps 1130, 1135, 1140 and 1145 are all omitted, and the procedure directly goes to step 1150. If it is determined that a reachability test is to be performed, the resource manager 260 instructs the data-streaming server 210 and the data-streaming client 220 to commence the reachability test (1130, 1135), and the data-streaming server 210 starts the reachability test (1140).

At this time, the data-streaming server 210 is already transmitting AV streams by using the allocated channel or preoccupies the allocated channel. When the AV streams are being transmitted, the data-streaming client 220 can use the AV streams to perform the reachability test. If the data-streaming server 210 preoccupies the allocated channel but does not transmit AV streams over the preoccupied channel, the reachability test can be performed in the same manner as shown in FIG. 10. If the reachability test fails, the data-streaming client 220 informs the resource manager 260 and the data-streaming server 210 of the cause of the failure and the like, and then terminates the process (1145). If the reachability test is successfully performed, the data-streaming client 220 notifies the resource manager 260 and the data-streaming server 210 that the channel can be used (1150). The data-streaming server 210 terminates the channel establishment process, and the resource manager 260 terminates the channel establishment process after modifying the topology map for apparatuses managed by itself (1155). If a channel allocated to the data-streaming server 210 and the data-streaming client 220 is established, the data-streaming server 210 transmits the AV streams to the data-streaming client 220 over the allocated channel. Since an allocated channel is exclusively used for each data-streaming server 210, any conflicts among servers are avoided.

FIG. 12 is a sequential diagram illustrating the process of releasing an allocated channel by a data-streaming client 220 consistent with an one embodiment of the present invention, and shows the process of stopping the transmission of the AV streams and releasing the allocated channel by the data-streaming server 210. In a case where there is only one data-streaming client 220 that receives the streaming data from the data-streaming server 210, it is necessary for the data-streaming server 210 to release a channel allocated to the data-streaming server 210 for transmission of the AV streams. In a case where there are a plurality of data-streaming clients 220 that receive the streaming data from the data-streaming server 210, it is necessary to perform the process of modifying the topology map by the connection state managing unit 430 of the resource manager 260.

A request for releasing the allocated channel is sent to the data-streaming server 210 by means of the application program 1210. The data-streaming server 210 transfers the received request to the resource manager 260 and the data-streaming client 220 (1215). The data-streaming client 220 that has received a channel release notification releases the allocated channel and resources associated therewith (1220). Meanwhile, since the resource manager 260 that has received the channel release notification has information on the data-streaming clients 220 which receive the AV streams from the data-streaming server 210, the resource manager 260 checks how many data-streaming clients 220 are now receiving the AV streams from the requested data-streaming server 210 (1225). If the data-streaming client 220 that has received the channel releasing request is the only data-streaming client 220 that receives the AV streams, the resource manager 260 notifies the data-streaming server 210 of the release of the allocated channel (1230).

The data-streaming server 210 performs termination tasks such as the release of resources associated with the allocated channel (1235) and then notifies the resource manager 260 of the release of the allocated channel (1240). Upon receipt of this message, the resource manager 260 modifies the topology map for the apparatuses in operation, and removes the relevant data-streaming server 210 and data-streaming clients 220 from the topology map (1245). If there are additional data-streaming clients 220 that are receiving the AV streams over the same allocated channel except the data-streaming client 220 that has received the channel releasing request, the resource manager 260 modifies the topology map for the apparatuses in operation and removes the data-streaming client 220, which has received the channel releasing request, from the topology map (1250).

FIG. 13 is a sequential diagram illustrating that a data-streaming client 220 is disconnected from an AV network according to an embodiment of the present invention. A disconnection request is issued by a user or application program and transferred to the data-streaming client 220 (1310). The data-streaming client 220 forwards this request to the resource manager 260 (1320). The resource manager 260 removes a data-streaming client 220 of which disconnection is requested (1330) from a list of the AV apparatus information managing unit 410 of the resource manager 260, and informs the data-streaming client 220 that tasks are completed and the data-streaming client 220 can be disconnected (1340). Thereafter, the data-streaming client 220 performs termination tasks such as the release of its own resources and terminates the role as a data-streaming client (1345).

FIG. 14 is a sequential diagram illustrating that a data-streaming server 210 is disconnected from an AV network consistent with an embodiment of the present invention. The data-streaming server 210 that has requested to be disconnected (1410) sends the disconnection request to the resource manager 260. The resource manager 260 checks whether it is being operated in the data-streaming server that currently requests disconnection (1414). If the data-streaming server in which the resource manager 260 operates is not the same as the data-streaming server 210 that has requested to be disconnected, the resource manager 260 removes the data-streaming server 210 from a list of AV apparatuses of the AV apparatus information managing unit 410 comprised in the resource manager 260 (1416), and informs the data-streaming server 210 that the disconnection is completed (1418). Then, the data-streaming server 210 performs termination tasks such as the release of its own resources and is completely disconnected from the AV network (1420).

If the data-streaming server in which the resource manager operates is the same as the data-streaming server that is requested to be disconnected, the resource manager 260 checks whether there is an additional data-streaming server in operation (1430). If there are no additional data-streaming servers, it means that the data-streaming server 210 that has received the disconnection request is the only data-streaming server present in the AV network. Thus, the resource manager 260 informs the data-streaming server 210 of the completion of disconnection (1432), performs termination tasks such as the release of its own resources (1436), and terminates its operation (1420).

Further, the data-streaming server 210 that has received a disconnection completion message (1432) also performs termination tasks such as the release of its own resources (1434). This process means disappearance of the AV network. If the data-streaming server in which the resource manager operates is the same as the data-streaming server that is requested to be disconnected, and there are other data-streaming servers 1400 present in the AV network, the resource manager selects another data-streaming server that will operate a resource manager to which the previous resource manager moves its own data (1440). Further, the selected data-streaming server 1400 is instructed to create a new resource manager 1446 (1442).

At this time, the previous resource manager 260 transfers its own data to the selected data-streaming server. Furthermore, the list of AV apparatuses is modified and then transferred. The requested data-streaming server creates the new resource manager 1446 while transferring the data of the previous resource manager (1444). The new resource manager 1446 notifies other AV apparatuses that the previous resource manager 260 has been replaced with the new resource manager 1446 (1448). The new resource manager 1446 informs the previous resource manager 260 that the new resource manager 1446 starts its operation (1450), and the previous resource manager 260 notifies the data-streaming server 210 of the disconnection (1452). Then, the previous data-streaming server 210 performs termination tasks such as the release of its own resources and terminates its operation (1454). At the same time, the previous resource manager 260 also performs termination tasks such as the release of its own resources and terminates its operation (1456).

Consistent with the present invention described above, the following advantages are obtained:

1. Since one allocated channel is exclusively used for each data-streaming server, one channel cannot be simultaneously used for data-streaming servers. Since this means that one data-streaming server exclusively uses an allocated channel, Quality of Service (QoS) can easily be accomplished. Further, since any propagation interferences do not occur, problems occurring in wireless multicasting/broadcasting can be minimized. Therefore, data-streaming servers and data-streaming clients can be easily developed in a wireless manner;

2. Implementation of a network consistent with the present invention enables a plurality of data-streaming servers and data-streaming clients to simultaneously perform streaming; and 3. Since a resource manager manages information on the network, this becomes a basis on which various functions for network-based application programs are provided. For example, a user can know which data-streaming server transmits streaming data to which data-streaming client. Further, upon occurrence of an error, the user can diagnose the cause of the error.

With the advantages of the present invention, it is expected that the present invention will greatly contribute to functions of wireless equipment such as wall-mounted TVs, set-top boxes and DVD players that are superior to existing equipment excellent in view of their performance.

Although the present invention has been described in connection with the embodiments illustrated in the drawings, it will be apparent to those skilled in the art that various substitutions, modifications and changes may be made thereto without departing from the technical spirit and scope of the invention. Thus, the present invention is not limited to the embodiments and the accompanying drawings.

What is claimed is:

1. A network apparatus for wireless transmission/reception of data streams having management information on wireless channels used for the data streams transmitted in an audio/video (A/V) wireless network which comprises a plurality of data streaming servers and data streaming clients, said network apparatus comprising:
a processor to process an event, upon occurrence of the event in the network, by extracting apparatus information for the apparatuses within the network from the management information and specifying a second data streaming server different from a first data streaming server according to the extracted information, and by transmitting an event response signal comprising the management information corresponding to the event or by updating the management information corresponding to the event, thereby generating, in the second data-streaming server, a module that manages the wireless channels for the data streams transmitted in the wireless manner among the apparatuses in the network, wherein only one channel is allocated to transfer a data stream for the second data streaming server by the managing module, and dummy data transmitted during the data stream is not transmitted in the allocated channel, wherein the management information comprises information on empty channels that are not used, and wherein the management information comprises information on connection states of the apparatuses in the network according to an allocated wireless channel.

2. The apparatus as claimed in claim 1, wherein the management information comprises information on allocated wireless channels.

3. The apparatus as claimed in claim 1, wherein the management information comprises apparatus information on the apparatuses in the network.

4. The apparatus as claimed in claim 1, wherein the management information comprises channel state information.

5. The apparatus as claimed in claim 1, wherein the event comprises an allocated channel request event to request a new allocated channel.

6. The apparatus as claimed in claim 1, wherein the event comprises allocated channel sharing request event to request sharing of a currently allocated channel.

7. The apparatus as claimed in claim 1, wherein the event comprises a network participation request event to indicate participation in an already established network.

8. The apparatus as claimed in claim 1, wherein the event comprises an allocated channel releasing request event to indicate releasing of an already established, allocated channel.

9. The apparatus as claimed in claim 1, wherein the event comprises a network disconnection request event to indicate disconnection from an already established network.

10. A data-streaming server in a network apparatus for wireless transmission/reception of data streams, which extracts apparatus information on apparatuses in an audio/video (A/V) wireless network which comprises a plurality of data streaming servers and data streaming clients, by a first data-streaming server, from management information on wireless channels available for data streams transmitted among the apparatuses in the network, designates a second data-streaming server different from the first data-streaming server, depending on the extracted information, and generates, in the second data-streaming server, a module comprising management information on the wireless channels used for the data streams transmitted in a wireless manner among the apparatuses in the network upon occurrence of an event in the network, wherein the module processes the event by one of transmitting an event response signal comprising the management information corresponding to the event and by updating the management information corresponding to the event, thereby managing the wireless channels for the data streams transmitted in the wireless manner among the apparatuses in the network, wherein only one channel is allocated to transfer a data stream for a second data streaming server by a managing module, wherein dummy data transmitted during the data stream is not transmitted in the allocated channel, wherein the management information comprises information on empty channels that are not used, wherein the management information comprises information on connection states of the apparatus in the network according to an allocated wireless channel, and wherein the server comprises: a control interface adapted to transmit and receive control signals to and from a plurality of apparatuses in a network via a wired/wireless communication network;
a channel selection unit operable to select a channel available in the network; and
a wireless interface adapted to transmit data streams in the network.

11. The data-streaming server as claimed in claim 10, wherein the management information comprises information on allocated wireless channels.

12. The data-streaming server as claimed in claim 10, wherein the management information comprises apparatus information on the apparatuses in the network.

13. The data-streaming server as claimed in claim 10, wherein the management information comprises channel state information.

14. The data-streaming server as claimed in claim 10, wherein the event comprises an allocated channel request event to request a new allocated channel.

15. The data-streaming server as claimed in claim 10, wherein the event comprises an allocated channel sharing request event to request sharing of a currently allocated channel.

16. The data-streaming server as claimed in claim 10, wherein the event comprises a network participation request event to indicate participation in an already established network.

17. The data-streaming server as claimed in claim 10, wherein the event comprises an allocated channel releasing request event to indicate releasing of an already established, allocated channel.

18. The data-streaming server as claimed in claim 10, wherein the event comprises a network disconnection request event to indicate disconnection from an already established network.

19. A data-streaming client in a network apparatus for wireless transmission/reception of data streams, which extracts apparatus information on apparatuses in an audio/video (A/V) wireless network which comprises a plurality of data streaming servers and data streaming clients, by a first data-streaming server, from management information on wireless channels available for data streams transmitted among the apparatuses in the network, designates a second data-streaming server different from the first data-streaming server, depending on the extracted information, and generates, in the second data-streaming server, a module comprising management information on the wireless channels used for the data streams transmitted in a wireless manner among the apparatuses in the network upon occurrence of an event in the network, wherein the module processes the event by one of transmitting an event response signal comprising the management information corresponding to the event and by updating the management information corresponding to the event, thereby managing the wireless channels for the data streams transmitted in the wireless manner among the apparatuses in the network, wherein only one channel is allocated to transfer a data stream for a second data streaming server by a managing module, wherein dummy data transmitted during the data stream is not transmitted in the allocated channel, wherein the management information comprises information on empty channels that are not used, wherein the management information comprises information on connection states of the apparatuses in the network according to an allocated channel, and wherein the client comprises: a control interface adapted to transmit and receive control signals to and from a plurality of apparatuses in a network via a wired/wireless communication network;

a channel selection unit operable to select a channel available in the network; and a wireless interface adapted to receive data streams in the network.

20. A network management method for wireless transmission/reception of a data stream, comprising:

extracting apparatus information on apparatuses in an audio/video (A/V) wireless network which comprises a plurality of data streaming servers and data streaming clients, by a first data-streaming server, from management information on wireless channels available for data streams transmitted among the apparatuses in the network;

designating a second data-streaming server different from the first data-streaming server, depending on the extracted information; and generating, in the second data-streaming server, a module comprising management information on the wireless channels used for the data streams transmitted in a wireless manner among the apparatuses in the network upon occurrence of an event in the network, wherein the module processes the event by one of transmitting an event response signal comprising the management information corresponding to the event and by updating the management information corresponding to the event, thereby managing the wireless channels for the data streams transmitted in the wireless manner among the apparatuses in the network, wherein only one channel is allocated to transfer a data stream for a second data streaming server by a managing module, wherein dummy data transmitted during the data stream is not transmitted in the allocated channel, wherein the management information comprises information on empty channels that are not used, wherein the management information comprises information on connection states of the apparatuses in the network according to an allocated channel.

21. The method as claimed in claim 20, wherein the management information comprises information on allocated wireless channels.

22. The method as claimed in claim 20, wherein the management information comprises apparatus information on the apparatuses in the network.

23. The method as claimed in claim 20, wherein the management information comprises channel state information.

24. The method as claimed in claim 20, wherein the event comprises an allocated channel request event to request newly allocated channel.

25. The method as claimed in claim 20, wherein the event comprises an allocated channel sharing request event to request sharing of a currently allocated channel.

26. The method as claimed in claim 20, wherein the event comprises a network participation request event to indicate participation in an already established network.

27. The method as claimed in claim 20, wherein the event comprises an allocated channel releasing request event to indicate releasing of an already established, allocated channel.

28. The method as claimed in claim 20, wherein the event comprises a network disconnection request event to indicate disconnection from an already established network.

\* \* \* \* \*